No. 874,019. PATENTED DEC. 17, 1907.
H. P. MOORE.
END CAP FOR ELECTRIC CONDUITS.
APPLICATION FILED APR. 6, 1907.
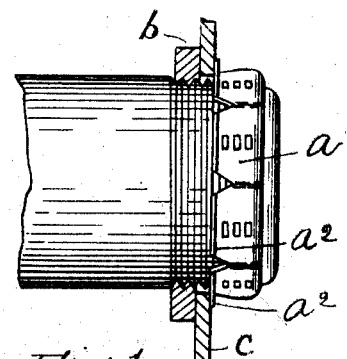
Fig. 1.
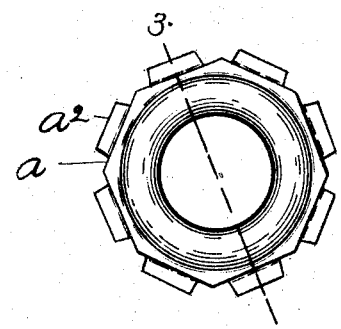
Fig. 2.
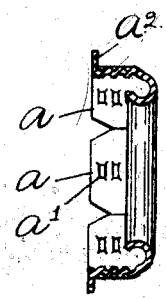
Fig. 3.
Fig. 4.
Fig. 5.
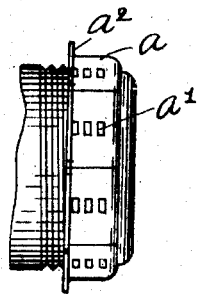
Fig. 6.
Witnesses:
H. B. Davis.
H. A. Boyle.
Inventor:
Harry P. Moore,
by Hayes & Harriman
Attys.

UNITED STATES PATENT OFFICE.

HARRY P. MOORE, OF NEWBURYPORT, MASSACHUSETTS.

END CAP FOR ELECTRIC CONDUITS.

No. 874,019.  Specification of Letters Patent.  Patented Dec. 17, 1907.

Application filed April 6, 1907. Serial No. 366,657.

*To all whom it may concern:*

Be it known that I, HARRY P. MOORE, of Newburyport, county of Essex, State of Massachusetts, have invented an Improvement in End Caps for Electric Conduits, of which the following description, in connection with the accompanying drawings, is a specification, like characters on the drawings representing like parts.

This invention relates to end caps for electric conduits, and has for its object to produce an end cap from ductile sheet metal having an attaching portion, a horizontal section of which is polygonal both exteriorly and interiorly, said attaching portion having eight or less faces which may be engaged and turned by an ordinary wrench, said attaching portion comprising eight or less straight leaves or ears or equivalent portions adapted to engage the pipe at points intermediate their length only, thereby extending tangentially from the cylindrical surface of the pipe in opposite ways, and not touching the pipe or its threads at the junction points of the faces of the attaching portion with each other, thereby decreasing the frictional contact with the threads of the pipe and increasing the ease of application; and also to provide said leaves or ears or equivalent portions of the polygonal attaching portion with inwardly extended projections at their points of engagement with the pipe, which enter the spaces between the threads on the pipe, said projections being arranged on the inner faces of said leaves or ears with respect to each other so as to follow the threads as the end cap is turned, to thereby move the cap along on the pipe. Also to provide the end cap with a spring acting attaching portion, which, when placed on the end of the pipe or conduit which projects through a hole in the wall of a junction box will yieldingly engage the wall of said box, to thereby serve as a means for holding the nut which is placed on the pipe or conduit at the opposite side of said wall.

Figure 1 shows in side elevation a portion of a pipe having on its end an end cap embodying this invention. Fig. 2 is an end view of the end cap. Fig. 3 is a vertical section of the end cap shown in Fig. 2, taken on the dotted line 3—3. Figs. 4 and 5 are details showing the leaves or ears in engagement with the pipe. Fig. 6 is a side view of an end cap having a modified form of polygonal attaching portion.

The end cap is struck up or drawn from a sheet of ductile metal, and has a polygonal attaching portion with eight or less faces and a rounded or finished edge surrounding the central aperture in the end, through which the wires extend.

My invention resides particularly in the construction of the polygonal attaching portion. This portion is composed of a plurality of straight leaves or ears, eight being herein shown. They may be separated more or less, as shown in Fig. 1, or they may not be separated, as shown in Fig. 6. These leaves or ears are so arranged as to engage the pipe at points intermediate their length only, and as shown in Figs. 4 and 5 the inner flat faces thereof will bear directly upon the threads on the pipe, at points substantially midway their length. The threads afford a firm bearing for the leaves or ears or equivalent portions, so that when engaged exteriorly by a wrench they may be firmly gripped in order that the cap may be turned without crushing the polygonal attaching portion. It will be noted that the leaves or ears, when thus arranged, extend tangentially to the cylindrical surface of the pipe in opposite ways, and the threads which they engage serve as seats to support them against being pressed inward when engaged by the wrench and turned. The leaves or ears $a$, have on their faces inwardly extended projections $a'$, some or all of the leaves having such projections. They may be few in number or many as desired. These projections are made so as to enter the spaces between the threads, to thereby hold the end cap firmly on a pipe, and as said cap is turned to follow the threads so that it will be moved along on the pipe.

The ends of the ears or leaves $a$ are turned up as shown at $a^2$, to provide abutting portions which are adapted to engage the wall $c$ of a junction box, and when the attaching portion consists of ears or leaves which are more or less separated they will have the capability of yielding, or, in other words, they are more or less spring-acting. When the cap is placed on the end of the pipe or conduit which projects through a hole in the wall $c$ of a junction box the upturned ends of the ears or leaves will engage said wall, and when the nut $b$ is turned up on said pipe at the opposite side of the wall $c$, said ears or leaves will yield, and as a result the end cap will serve to lock the nut or as a means for holding said nut in place.

Having thus described my invention, what I claim as new and desire to secure by Letters Patent is:—

1. An end cap for electric conduits struck up or drawn from ductile sheet metal having an attaching portion, a horizontal section of which is polygonal both exteriorly and interiorly, having eight or less faces which engage the threads in the pipe at points intermediate to their length only, and having on their inner faces, at such points of engagement, inwardly extended projections which enter the spaces between the threads, which are arranged to follow the threads as the cap is turned, to thereby move the cap along on the pipe, substantially as described.

2. The end cap for electric conduits struck up or drawn from ductile sheet metal having an attaching portion composed of a plurality of spring-acting ears or leaves with upturned ends and with inwardly extended projections adapted to enter the spaces between the threads on the pipe or conduit, substantially as described.

In testimony whereof, I have signed my name to this specification, in the presence of two subscribing witnesses.

HARRY P. MOORE.

Witnesses:
B. J. NOYES,
H. B. DAVIS.